(12) United States Patent
Smirnov

(10) Patent No.: US 8,780,492 B1
(45) Date of Patent: Jul. 15, 2014

(54) SPINDLE MOTOR HAVING COUPLING MEMBER BETWEEN BASE MEMBER AND CORE AND HARD DISK DRIVE INCLUDING THE SAME

(71) Applicant: Samsung Electro-Mechanics Co., Ltd., Suwon (KR)

(72) Inventor: Viatcheslav Smirnov, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/795,171

(22) Filed: Mar. 12, 2013

(30) Foreign Application Priority Data

Dec. 27, 2012 (KR) .................. 10-2012-0155289

(51) Int. Cl.
*G11B 19/20* (2006.01)
*F16C 32/06* (2006.01)
(52) U.S. Cl.
USPC ............ 360/98.07; 360/99.08; 384/107; 384/114; 310/90
(58) Field of Classification Search
USPC ........ 360/98.07, 99.08; 384/107, 114; 310/90
See application file for complete search history.

(56) References Cited

U.S. PATENT DOCUMENTS

| | | | | |
|---|---|---|---|---|
| 5,619,389 A * | 4/1997 | Dunfield et al. | ........... | 360/98.07 |
| 6,707,640 B2 | 3/2004 | Nishio et al. | | |
| 6,952,324 B2 * | 10/2005 | Khan et al. | ............... | 360/99.08 |
| 7,589,934 B2 * | 9/2009 | Asada et al. | ............... | 360/99.08 |
| 2003/0235006 A1 * | 12/2003 | Ameen et al. | ............. | 360/99.08 |
| 2005/0116564 A1 | 6/2005 | Tokunaga et al. | | |
| 2006/0181174 A1 * | 8/2006 | Liu | .............................. | 310/217 |
| 2006/0221495 A1 | 10/2006 | Tamaoka et al. | | |

FOREIGN PATENT DOCUMENTS

| | | |
|---|---|---|
| JP | 2004-328926 | 11/2004 |
| JP | 2007-20241 | 1/2007 |

* cited by examiner

*Primary Examiner* — Jefferson Evans

(57) ABSTRACT

There is provided a spindle motor including: a fluid dynamic pressure bearing assembly; a base member coupled to the fluid dynamic pressure bearing assembly; and a core fixedly coupled to the base member and having a coil wound therearound, wherein the base member has a disk portion and a coupling portion extending from an inner edge of the disk portion upwardly in an axial direction, one surface of the core is in contact with an outer circumferential surface of the overall coupling portion, and an upper end of the coupling portion is protruded upwardly, relative to an upper surface of the core.

18 Claims, 13 Drawing Sheets

SPINDLE MOTOR HAVING COUPLING MEMBER BETWEEN BASE MEMBER AND CORE AND HARD DISK DRIVE INCLUDING THE SAME

CROSS-REFERENCE TO RELATED APPLICATIONS

This application claims the priority of Korean Patent Application No. 10-2012-0155289 filed on Dec. 27, 2012, in the Korean Intellectual Property Office, the disclosure of which is incorporated herein by reference.

BACKGROUND OF THE INVENTION

1. Field of the Invention

The present invention relates to a spindle motor and a hard disk drive including the same.

2. Description of the Related Art

A hard disk drive (HDD), an information storage device, is a device for reading data stored on a disc or writing data to a disc with a read/write head.

A hard disk drive requires a disc driving device for driving a disc, and a small spindle motor is used in the disc driving device.

A spindle motor employs a fluid dynamic bearing assembly (or a hydrodynamic bearing assembly), in which a lubricating fluid is interposed between a shaft, a rotary member of the fluid dynamic bearing assembly, and a sleeve, a fixed member of the fluid dynamic bearing assembly, and the shaft is supported by fluid pressure generated in the lubricating fluid.

Here, a lubricating fluid injected into a fluid dynamic bearing assembly may be leaked to outside or an amount of the lubricating fluid may be reduced due to evaporation, reducing pressure generation in a fluid dynamic bearing and leading to a problem with performance and a lifespan of the spindle motor.

Also, in a case in which an internal component of the spindle motor is deformed due to external impacts applied to the spindle motor while the spindle motor is being driven, the driving of the spindle motor is negatively affected, so, it is important to secure rigidity of the spindle motor.

Thus, research into a spindle motor that may have rigidity sufficient to allow an internal component thereof to resist deformation in spite of external impacts applied thereto, and have performance and lifespan maximized by securing a storage space of a lubricating fluid is urgently required to be conducted.

SUMMARY OF THE INVENTION

An aspect of the present invention provides a spindle motor having enhanced rigidity and enhanced binding strength (or coupling force) between a base member and a core, and a hard disk drive including the same.

Another aspect of the present invention provides a spindle motor in which deformation of an internal component is prevented in spite of external impacts, or the like, and a hard disk drive including the same.

An aspect of the present invention provides a spindle motor in which a base member and a cover plate are fabricated by performing plastic deformation on a steel plate to thus improve production capacity, and a hard disk drive including the same.

An aspect of the present invention provides a spindle motor having a lengthened lifespan by increasing a storage space of a lubricating fluid, and preventing leakage of a lubricating fluid and introduction of foreign objects, and a hard disk drive including the same.

According to an aspect of the present invention, there is provided a spindle motor including: a fluid dynamic pressure bearing assembly; a base member coupled to the fluid dynamic pressure bearing assembly; and a core fixedly coupled to the base member and having a coil wound therearound, wherein the base member has a disk portion and a coupling portion extending from an inner edge of the disk portion upwardly in an axial direction, one surface of the core is in contact with an outer circumferential surface of the overall coupling portion, and an upper end of the coupling portion is protruded upwardly, relative to an upper surface of the core.

The upper end of the coupling portion may be bent outwardly in a radial direction and support the upper surface of the core.

A labyrinth sealing portion may be provided between the fluid dynamic pressure bearing assembly and the coupling portion.

A recess portion may be formed to be depressed in the coupling portion of the base member coupled to the fluid dynamic pressure bearing assembly, and a sealing member may be provided in the recess portion.

The fluid dynamic pressure bearing assembly may include: a shaft having a body portion, an extending portion extending from an upper portion of the body portion outwardly in the radial direction, and a protrusion portion extending from an outer edge of the extending portion in an axial direction; a sleeve rotatably supporting the shaft; and a cover plate coupled to the sleeve, while maintaining a gap with regard to the shaft and a lower portion of the sleeve, wherein the fluid dynamic pressure bearing assembly may further include: a rotor having a hub base coupled to the extending portion so as to be rotatable in conjunction with the shaft and a stopper portion extending from the hub base such that the stopper portion faces an outer circumferential surface of the sleeve.

The cover plate may include an airtight portion disposed below the shaft and the sleeve, an inner wall portion extending from the airtight portion in the axial direction and coupled to an outer circumferential surface of the sleeve, an outer wall portion coupled to the base member, and an upper wall portion connecting an upper end of the inner wall portion and an upper end of the outer wall portion.

A micro-gap may be formed between an outer circumferential surface of the stopper portion and an inner circumferential surface of the coupling portion.

A first sealing recess may be formed to be depressed inwardly on an outer circumferential surface of the stopper portion, and a second sealing recess may be formed to be depressed inwardly on an inner circumferential surface of the coupling portion at a position corresponding to the first sealing recess.

An outer circumferential surface of the stopper portion may be formed to be stepped inwardly in the radial direction, and an inner circumferential surface of the coupling portion disposed to face the outer circumferential surface of the stopper portion may have a shape corresponding to the outer circumferential surface of the stopper portion.

An upper end of the coupling portion may be bent inwardly in the radial direction and support an upper surface of the upper wall portion.

A fluid-air interface of a lubricating fluid may be formed between a lower surface of the stopper portion and an upper surface of the upper wall portion.

The lower surface of the stopper portion and the upper surface of the upper wall portion may face one another, and the lower surface of the stopper portion and the upper surface of the upper wall portion may be sloped.

The lower surface of the stopper portion and the upper surface of the upper wall portion may be sloped downwardly toward an outer side in the radial direction.

The fluid dynamic pressure bearing assembly may include: a shaft directly or indirectly fixed to the base member; a rotary member forming a bearing clearance with regard to the shaft and rotatable with respect to the shaft; and a lower thrust member having a fixed portion coupled to a lower portion of the shaft, and a bent portion extending from an outer edge of the fixed portion and having an outer circumferential surface coupled to the base member.

An upper end of the coupling portion may be bent inwardly in the radial direction and support an upper surface of the bent portion.

According to another aspect of the present invention, there is provided a hard disk drive including: a spindle motor rotating a disk with power applied through a board; a magnetic head for writing data to the disk or reading data from the disk; and a head driving unit moving the magnetic head to a predetermined position on the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
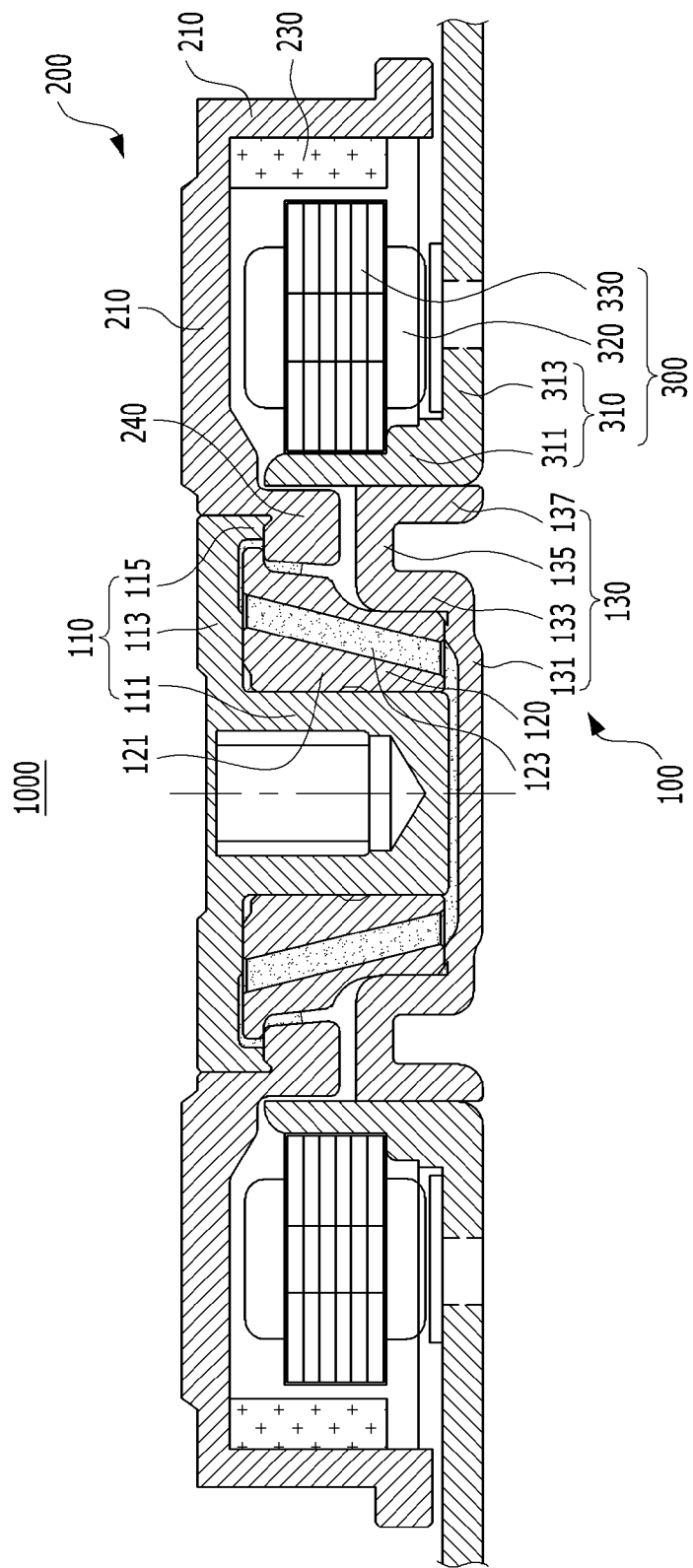
FIG. 1 is a schematic cross-sectional view of a spindle motor according to a first embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 2:
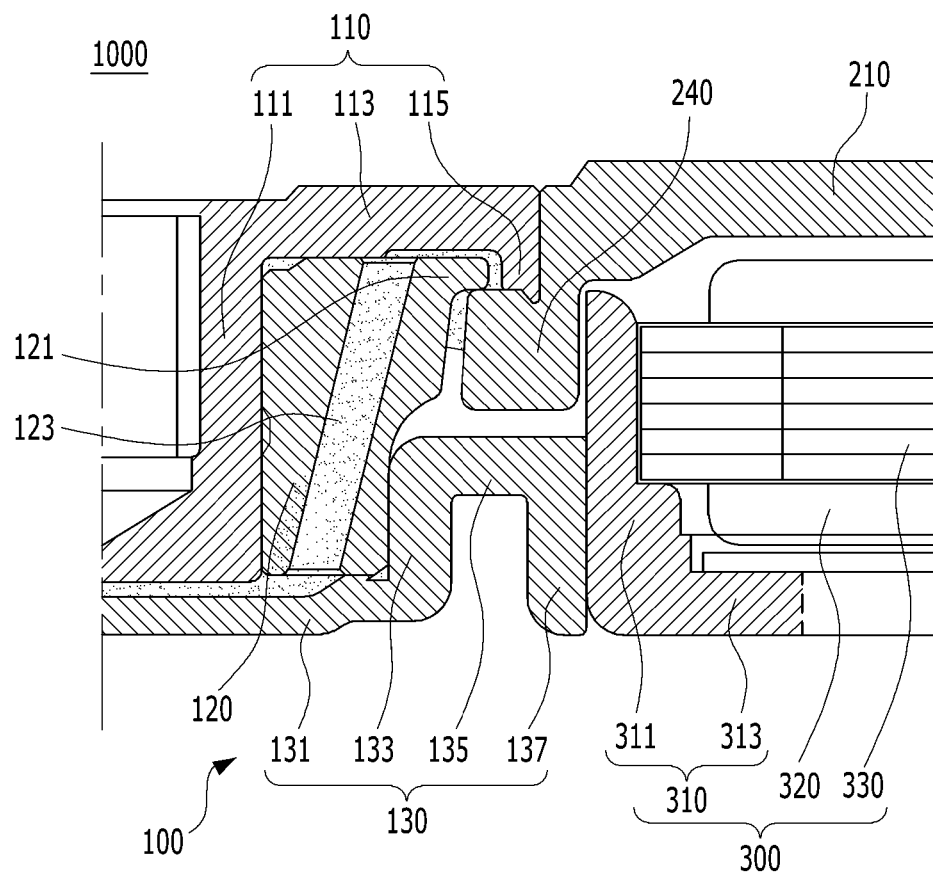
FIG. 2 is a cross-sectional view of half of the spindle motor according to the first embodiment of the present invention.

FIG. 1 is a schematic cross-sectional view of a spindle motor according to a first embodiment of the present invention. FIG. 2 is a cross-sectional view of half of the spindle motor according to the first embodiment of the present invention.

Referring to FIGS. 1 and 2, a spindle motor 1000 according to a first embodiment of the present invention may include a fluid dynamic bearing assembly 100, a stator 300 as a fixed member, and a rotor 200 as a rotating member.

First, referring to definitions of directional terms, an axial direction may refer to a vertical direction based on a shaft 110, and an outer and inner radial direction may refer to an outer edge direction of the a rotor 200 based on the shaft 110 or a central direction of the shaft 110 based on an outer edge of the rotor 200, respectively.

The fluid dynamic bearing assembly 100 may include a shaft 110, a sleeve 120, and a cover plate 130.

The shaft 110 may be a rotating member rotating in conjunction with the rotor 200.

The shaft 110 may include a body portion 111 inserted into an axial hole of the sleeve 120 and an extending portion 113 extending from an upper end of the body portion 111 in the outer radial direction.

Here, the extending portion 113 may be provided such that an outer edge thereof is formed on an outer side in the radial direction, relative to an outer circumferential surface of the sleeve 120, and the end of the extending portion 113 may be combined to the rotor 200.

Thus, the extending portion 113 and the rotor 200 may be combined in an outer side in the radial direction, relative to the outer circumferential surface of the sleeve 120.

Here, the shaft 110 may further include a protrusion 115 extending from the outer edge of the extending portion in the axial direction in order to increase a coupling area with the rotor 200.

Namely, an outer circumferential surface of the extending portion 113 and an outer circumferential surface and a lower surface of the protrusion 115 are coupled to the rotor 200, a coupling area of the shaft 110 and the rotor 200 may be increased to enhance bonding force of the shaft 110 and the rotor 200.

Thus, since the shaft 110 and the rotor 200 are stably coupled, rigidity of the spindle motor 400 may be enhanced.

The shaft may be inserted in a shaft hole of the sleeve 120 such that an upper end thereof is protruded, and the rotor 200 may be coupled to the upper end of the shaft 110 so as to be rotated in conjunction with the shaft 110.

The sleeve 120 may be formed by forging copper (Cu) or aluminum (Al) or sintering Cu—Fe-based alloy powder or SUS-based powder.

Here, the shaft 110 is inserted to have a micro-gap (or a micro-clearance) with a shaft hole of the sleeve 120, and a lubricating fluid is charged in the micro-gap. A rotation of the shaft 110 may be more smoothly supported by radial dynamic pressure generating grooves (not shown) formed on at least one of the outer diameter of the shaft 110 and an inner diameter of the sleeve 120.

The radial dynamic pressure generating grooves (not shown) may be formed on an inner circumferential surface of the sleeve 120, i.e., the interior of the shaft hole of the sleeve 120, and form a pressure allowing the shaft 110 to be spaced apart from the inner circumferential surface of the sleeve 120 by a certain interval so as to rotate smoothly.

However, without being limited to the configuration in which the radial dynamic pressure generating grooves (not shown) are formed on the inner circumferential surface of the sleeve 120 as mentioned above, the radial dynamic pressure generating grooves (not shown) may be provided in an outer circumferential surface of the shaft 110 and an amount of the radial dynamic pressure generating grooves is not limited.

The radial dynamic pressure generating grooves (not shown) may have any one of a herringbone pattern, a spiral pattern, and a helical pattern, and the shape of the radial dynamic pressure generating grooves is not limited as long as it can generate radial dynamic pressure.

Also, thrust dynamic pressure grooves (not shown) may be formed on at least one of an upper surface of the sleeve 120 and one surface of the extending portion of the shaft 110 facing the upper surface of the sleeve 120. By virtue of the thrust dynamic pressure grooves (not shown), the shaft 110 may rotate in conjunction with the rotor 200, while maintaining predetermining levitation force.

Here, like the radial dynamic pressure grooves (not shown), the thrust dynamic pressure grooves (not shown) may have a herringbone pattern, a spiral pattern, or a helical pattern, but the present invention is not limited thereto and the thrust dynamic pressure grooves (not shown) may have any shape as long as it can provide thrust dynamic pressure.

Also, at least one bypass flow channel 123 may be formed in the sleeve 120 and connect upper and lower portions of the sleeve 120.

The bypass flow channel 123 may disperse pressure of a lubricating fluid to balance it, and allow bubbles existing within the lubricating fluid to move so as to be expelled through circulation.

The cover plate 130 may be coupled to the sleeve, while maintaining a gap with regard to lower portions of the shaft 110 and the sleeve 120.

The cover plate 130 may support a lower surface of the shaft 110 by accommodating a lubricating fluid in the gap formed between the cover plate 130 and the sleeve 120.

Here, the cover plate 130 may be fixed according to various methods such as welding, caulking, bonding, or the like. A method of fixing the cover plate 130 may be selectively applied according to a structure and a process of a product.

A specific shape of the cover plate 130 will be described later.

The stator 300 may include a coil 320, a core 330, and a base member 310.

The stator 300 is a fixed structure having the core 330 around which the coil 320 generating electromagnetic force having a predetermined magnitude when power is applied thereto is wound.

The core 330 may be fixedly disposed on a base member 310 in which a printed circuit board (PCB) (not shown) with a pattern circuit printed thereon. A plurality of coil holes having a predetermined size may be formed in a penetrative manner in an upper surface of the base member 310 corresponding to the core 330 around which the coil 320 is wound, such that the coil is exposed downwardly. The coil 320 may be electrically connected to the PCB (not shown) such that external power is applied thereto.

The base member 310 may be fabricated by performing plastic working (or press working) on a steel sheet.

In detail, a basic configuration of the base member 310 may be fabricated through press working, and subsequently bent or cut as follow-up working to fabricate a final configuration of the base member 310.

Namely, the base member 310 of the spindle motor 1000 according to the first embodiment of the present invention may be produced by performing plastic working such as press working, or the like, on a lightweight alloy steel such as a cold rolled steel sheet (e.g., steel plate cold commercial (SPCC), SPEC, or the like), a hot rolled steel sheet, stainless steel, boron, a magnesium alloy, or the like, through a single process or an additional process, unlike the related art in which the base member is produced by a post-processing scheme in which aluminum (A) is die-cast and burrs, or the like, generated through the die-casting is removed.

Thus, since the base member 310 of the spindle motor 1000 according to the first embodiment of the present invention is fabricated through press-working, a process time and energy consumption can be minimized, resultantly enhancing production capacity.

The base member 310 may include a disk portion 313 and a coupling portion 311 extending from an inner edge of the disk portion 313 upwardly in the axial direction, and the core 330 may be coupled to an outer circumferential surface of the coupling portion 311.

Here, one surface of the core 330 may be in contact with an outer circumferential surface of the overall coupling portion 311, and an upper end of the coupling portion 311 may be protruded upwardly, relative to an upper surface of the core 330.

Thus, since a contact area between the core 330 and the base member 310 is increased, binding strength between the core 330 and the base member 310 can be enhanced.

The rotor 200 may be a rotating structure which is rotatably provided with respect to the stator 300. The rotor 200 may have an annular magnet 230 formed on an inner circumferential surface thereof. The annular magnet 230 may correspond to the core 330 with a predetermined space therebetween.

Here, the rotor 200 may include a hub base 210 fixedly coupled to the extending portion of the shaft 110 and a magnet support portion 220 bent downwardly from the hub base 210 in an axial direction and supporting the magnet 230.

The magnet 230 may be provided as a permanent magnet having an N pole and an S pole alternately magnetized in the circumferential direction to generate magnetic force having a predetermined magnitude.

A rotational driving of the rotor 200 will be described briefly. When power is supplied to the coil 320 wound around the core 330, driving force (or power) is generated, allowing the rotor 200 to rotate according to electromagnetic interaction between the magnet 230 and the core 330 with the coil 320 wound therearound.

Accordingly, the rotor 200 rotates, and accordingly, the shaft 110 to which the rotor 200 is fixedly coupled is rotated in conjunction with the rotor 200.

The rotor 200 may have a stopper portion 240 extending from the disk portion 210 and be disposed to face an outer circumferential surface of the sleeve 120.

A lubricating fluid may be sealed between an inner circumferential surface of the stopper 240 and an outer circumferential surface of the sleeve 120.

The inner circumferential surface of the stopper portion 240 and the outer circumferential surface of the sleeve 120 corresponding to the inner circumferential surface of the stopper portion 240 may be formed to be sloped to allow the lubricating fluid to be sealed therebetween.

Here, the sleeve 120 may have a flange portion 122 formed on an upper portion thereof. The flange portion 122 may be protruded in an outer radial direction, and a lower surface of the flange portion 122 may face a portion of an upper surface of the stopper portion 240.

Thus, when the shaft 110 and the rotor 200, rotating members, excessively float, a portion of the upper surface of the stopper portion 240 is caught by the flange portion 122, preventing the rotating members from floating excessively.

The cover plate 130 may include an airtight portion 131 disposed below the shaft 110 and the sleeve 120, an inner wall portion 133 extending from the airtight portion 131 in the axial direction and coupled to an outer circumferential surface of the sleeve 120, an outer wall portion 137 coupled to the base member 310, and an upper wall portion 135 connecting an upper end of the inner wall portion 133 and an upper end of the outer wall portion 137.

The airtight portion 131 may be disposed to maintain a gap with the shaft 110 and the sleeve 120, and the inner wall portion 133 may extend from the airtight portion 131 in the axial direction.

The inner wall portion 133 may coupled to the outer circumferential surface of the sleeve 120 to fix the sleeve 120.

In detail, an inner circumferential surface of the inner wall portion 133 and an outer circumferential surface of the sleeve 120 may be coupled, and in this case, the inner circumferential surface of the inner wall portion 133 and the outer circumferential surface of the sleeve 120 may be coupled through at least one of sliding, bonding, welding, and press-fitting methods.

The outer wall portion 137 may be coupled to an inner circumferential surface of the base member 310 fixing the core 330 around which the coil 320 is wound. Specifically, the outer wall portion 137 may be coupled to an inner circumferential surface of the coupling portion 311 of the base member 310.

The outer circumferential surface of the outer wall portion 137 and the inner circumferential surface of the base member 310 may be coupled according to at least one of sliding, bonding, welding, and press-fitting methods.

The upper wall portion 135 may be configured to connect an upper end of the inner wall portion 133 and an upper end of the outer wall portion 137, and an upper surface of the upper wall portion 135 may be formed as a flat surface.

Here, the cover plate 130 may be formed by plastic-deforming a steel sheet. In detail, a basic configuration of the cover plate 130 is fabricated through press working, and subsequently bent or cut as follow-up working to fabricate a final configuration of the cover plate 130.

Namely, the cover plate 130 according to an embodiment of the present invention may be produced by performing plastic working such as press working, or the like, on a lightweight alloy steel such as a cold rolled steel sheet (e.g., steel plate cold commercial (SPCC), SPEC, or the like), a hot rolled steel sheet, a stainless steel, a boron or magnesium alloy, or the like, through a single process or an additional process.

Thus, the cover plate 130 according to an embodiment of the present invention may minimize a processing time and energy consumption, resultantly enhancing production capacity.

Also, since the cover plate 130 is made of an iron steel plate or an alloy, overall rigidity of the spindle motor may be enhanced.

The inner wall portion 133, the upper wall portion 135, and the outer wall portion 137 of the cover plate 130 are disposed between the sleeve 120 and the base member 310. Thus, even in the case that a load or external impacts are applied in the axial direction or the radial direction, since the inner wall portion 133, the upper wall portion 135, and the outer wall portion 137 of the cover plate 130 support the sleeve 120 and the base member 310, internal components are prevented from being deformed.

Figure 3:
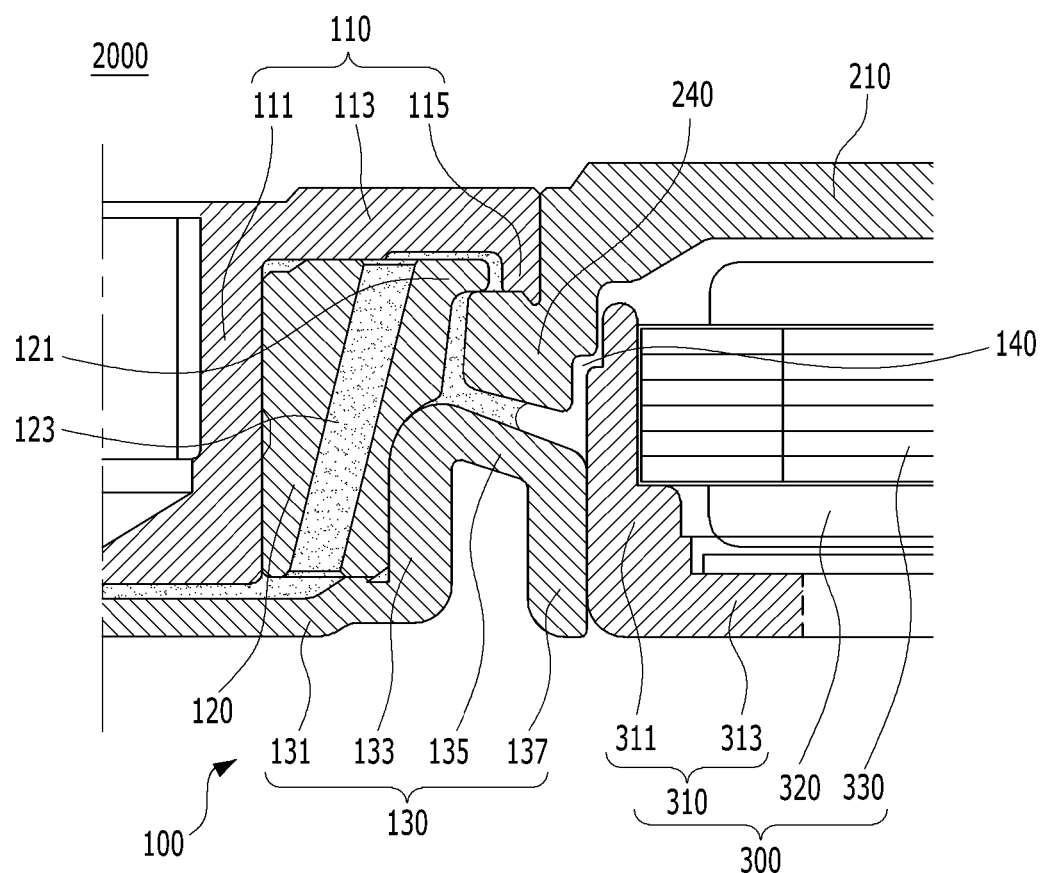
FIG. 3 is a cross-sectional view of half of a spindle motor according to a second embodiment of the present invention.
Figure 4:
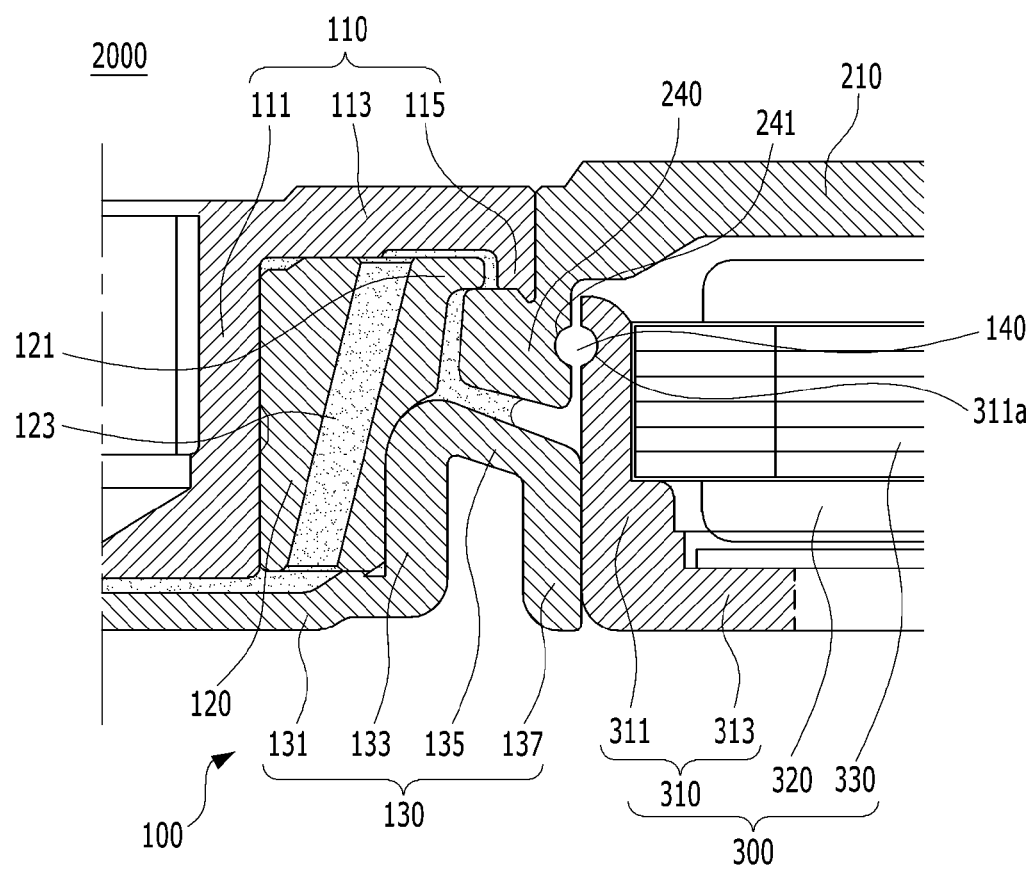
FIG. 4 is a cross-sectional view of half of a modification of a labyrinth sealing unit of the spindle motor according to the second embodiment of the present invention.

FIG. 3 is a cross-sectional view of half of a spindle motor according to a second embodiment of the present invention, and FIG. 4 is a cross-sectional view of half of a modification of a labyrinth sealing unit of the spindle motor according to the second embodiment of the present invention.

Referring to FIGS. 3 and 4, a spindle motor 2000 according to the second embodiment of the present invention has the same configuration as that of the spindle motor 1000 according to the first embodiment of the present invention, except for a labyrinth sealing unit 140 and a position at which a fluid-air interface of a lubricating fluid is formed. Thus, a description of components other than the labyrinth sealing unit 140 and the position at which a fluid-air interface of a lubricating fluid is formed will be omitted.

In the spindle motor 2000 according to the second embodiment of the present invention, a fluid-air interface of a lubricating fluid may be formed between a lower surface of the stopper unit 240 and an upper surface of the upper wall portion 135.

To this end, the lower surface of the stopper unit 240 and the upper surface of the upper wall portion 135 may be disposed to face one another and a predetermined micro-gap may be formed between the lower surface of the stopper 240 and an upper surface of the upper wall portion 135.

The lower surface of the stopper unit 240 and the upper surface of the upper wall portion 135 may be sloped to allow a lubricating fluid to be sealed therein, and specifically, the lower surface of the stopper unit 240 and the upper surface of the upper wall portion 135 may be formed to be sloped downwardly toward the outer edge in the radial direction.

Since a lubricating fluid is sealed between the lower surface of the stopper unit 240 and the upper surface of the upper wall portion 135, increased storage space for the lubricating fluid may be secured, relative to the case in which the lubricating fluid is sealed between the outer circumferential surface of the sleeve 120 and the inner circumferential surface of the stopper unit 240, and as a result, a lifespan of the spindle motor can be increased.

While the spindle motor is being driven, the lubricating fluid may be gradually reduced due to factors such as leakage, evaporation, or the like, of the lubricating fluid, failing to provide a sufficient fluid pressure to negatively affect the driving of the spindle motor.

However, in the spindle motor 2000 according to the second embodiment of the present invention, since the fluid-air interface of a lubricating fluid is formed between the lower surface of the stopper unit 240 and the upper surface of the upper wall portion 135 to seal a lubricating fluid therein, a sufficient storage space for a lubricating fluid can be secured, and as a result, a lifespan of the spindle motor can be increased.

The labyrinth sealing portion 140 may be formed between an outer circumferential surface of the stopper portion 240 and an inner circumferential surface of the coupling portion 311.

Here, a portion of the outer circumferential surface of the stopper portion 240 may be depressed inwardly in the radial direction so as to form a step, and the inner circumferential surface of the coupling portion 311 facing the outer circumferential surface of the stopper portion 240 may also be formed to have a step to correspond to the configuration of the outer circumferential surface of the stopper portion 240.

An effect of changing a pressure can be maximized by the labyrinth searing portion 140 formed between the outer circumferential surface of the stopper portion 240 and the inner circumferential surface of the coupling portion 311, resultantly enhancing a sealing effect of a lubricating fluid.

Namely, the labyrinth sealing portion 140 may restrain air containing a lubricating fluid evaporated from the fluid-air interface of the lubricating fluid from being leaked outwardly, preventing the lubricating fluid from being reduced and preventing an external foreign object from being introduced.

Also, referring to FIG. 4, a first sealing recess 241 may be formed on an outer surface of the stopper portion 240 such that it is depressed inwardly, and in this case, the first sealing recess 241 may have a hemispherical shape.

Also, a second sealing recess 311a may be formed on an inner circumferential surface of the coupling portion 311 facing the outer circumferential surface of the stopper portion 240 facing the upper surface of the connection portion 343, such that it is depressed in the radial direction. The second sealing recess 311a may have a hemispherical shape.

However, the shape of the first and second sealing recesses 241 and 311a formed on the outer circumferential surface of the stopper portion 240 and the inner circumferential surface of the coupling portion 311 is not limited to the hemispherical shape, and the first and second sealing recesses 241 and 311a may have any shape as long as a labyrinth sealing effect can be obtained thereby.

Due to the presence of the first and second sealing recesses 241 and 311a, an extending space is formed between the outer surface of the stopper portion 240 and the inner circumferential surface of the coupling portion 311 to serve as the labyrinth sealing portion 140.

Thus, as air introduced to the relatively small space meets the expanding space, a flow rate thereof is rapidly reduced, resultantly enhancing a sealing effect.

Namely, the labyrinth sealing portion 140 may restrain air containing an evaporated lubricating fluid from being leaked outwardly, preventing the lubricating fluid from being reduced and preventing an external foreign object from being introduced.

Figure 5:
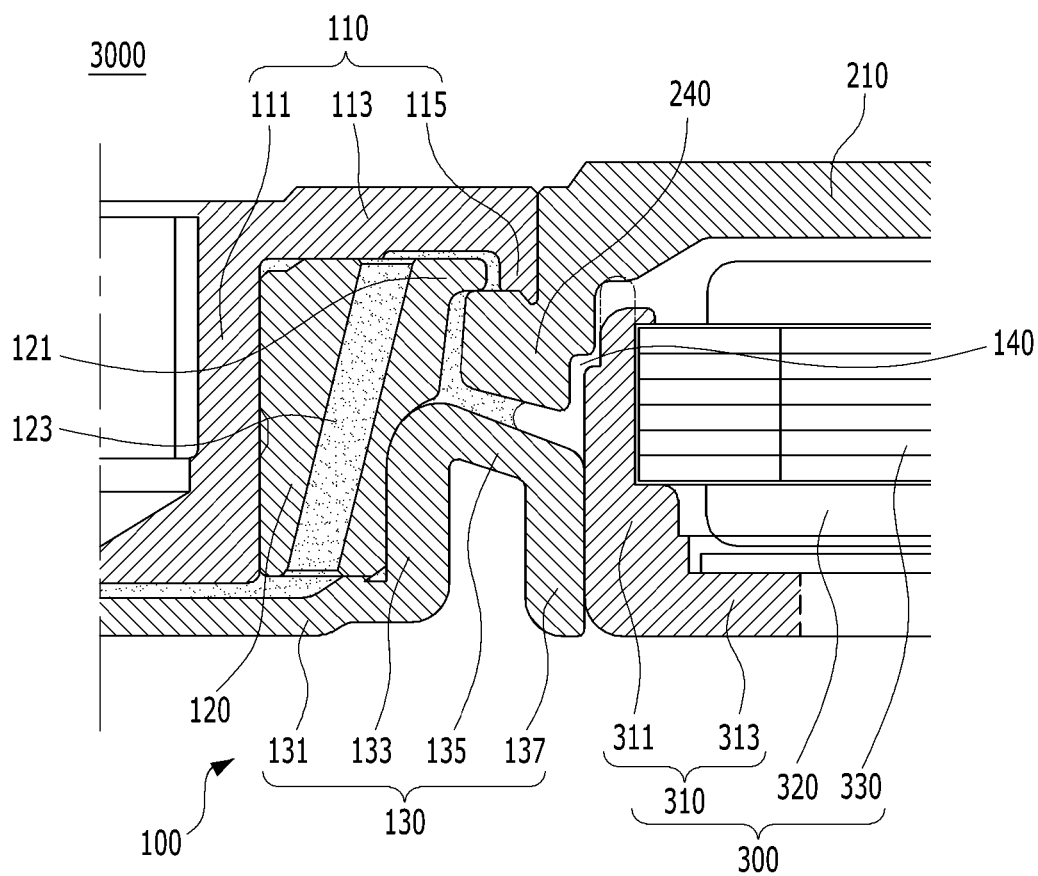
FIG. 5 is a cross-sectional view of half of a spindle motor according to a third embodiment of the present invention.

FIG. 5 is a cross-sectional view of half of a spindle motor according to a third embodiment of the present invention.

Referring to FIG. 5, a spindle motor 3000 according to the third embodiment of the present invention is the same as the spindle motor 2000 according to the second embodiment of the present invention, except for a coupling scheme of the base member 310 and the core 330, so a description of components other than the coupling scheme of the base member 310 and the core 330 will be omitted.

The base member 310 may include a disk portion 313 and a coupling portion 311 extending from an inner end of the disk portion 313 upwardly in the axial direction.

The core 330 may be coupled to an outer circumferential surface of the coupling portion 311.

Here, one surface of the core 330 may be in contact with an outer circumferential surface of the overall coupling portion 311, and a step may be formed on the outer circumferential surface of the coupling portion 311 and the core 330 may be installed on the step.

Also, an upper end of the coupling portion 311 may be protruded upwardly, relative to an upper surface of the core 330.

Here, the upper end of the coupling portion 311 protruded upwardly, relative to the upper surface of the core 330, may be bent outwardly in the radial direction so as to support the upper surface of the core 330.

Thus, since the contact area between the core 330 and the base member 310 is increased, binding strength between the core 330 and the base member 310 can be enhanced.

Figure 6:
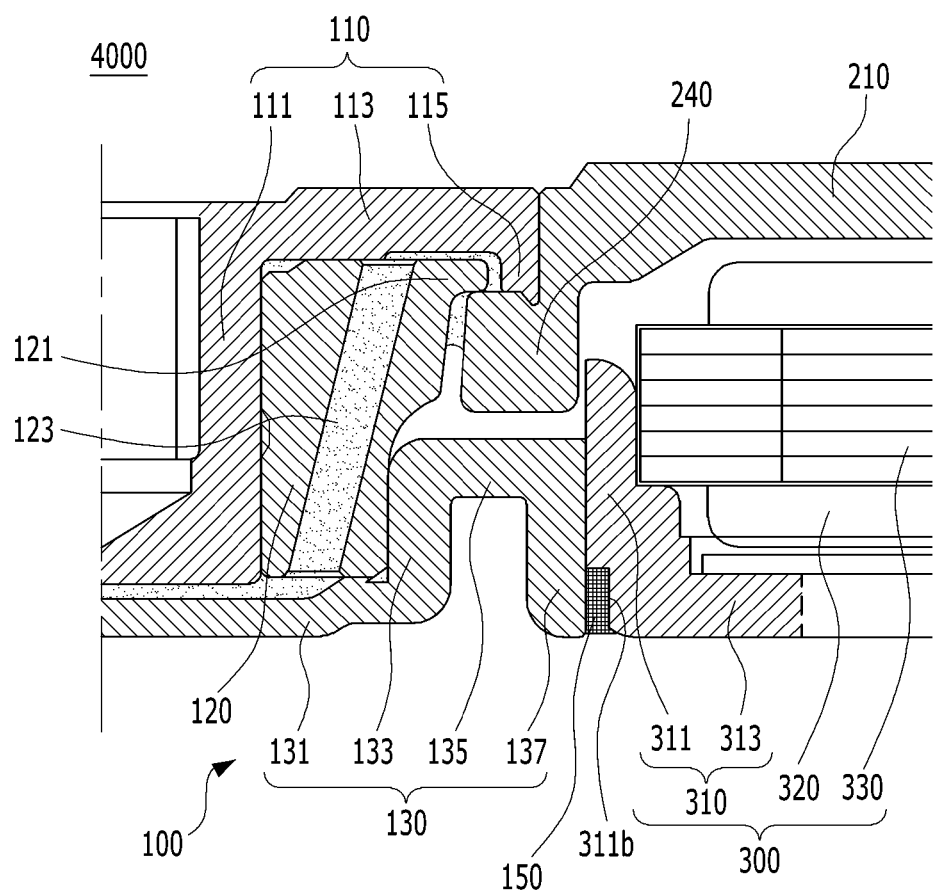
FIG. 6 is a cross-sectional view of half of a spindle motor according to a fourth embodiment of the present invention.

FIG. 6 is a cross-sectional view of half of a spindle motor according to a fourth embodiment of the present invention.

Referring to FIG. 6, a spindle motor 4000 according to the fourth embodiment of the present invention is the same as the spindle motor 1000 according to the first embodiment of the present invention, except for a sealing member 150, so a description of components other than the sealing member 150 will be omitted.

A portion of the inner circumferential surface of the coupling portion 311 provided in the base member 310 may be depressed inwardly to form an accommodation recess 311b.

The sealing member 150 may be provided in the accommodation portion 311b to reduce noise or vibrations that may be generated while the spindle motor is being driven.

The sealing member 150 may be made of plastic, rubber, a resin, aluminum, brass, or a magnesium alloy, but the present invention is not limited thereto and the sealing member 150 may be made of any material as long as it can obtain a noise or vibration reducing effect.

Also, an adhesive may be used as the sealing member 150, and the adhesive filling the accommodation recess 311b can enhance binding strength between the cover plate 130 and the base member 310.

Also, since the sealing member 150 fills the accommodation recess 311b, deformation of the spindle motor due to external impacts can be further effectively prevented.

Figure 7:
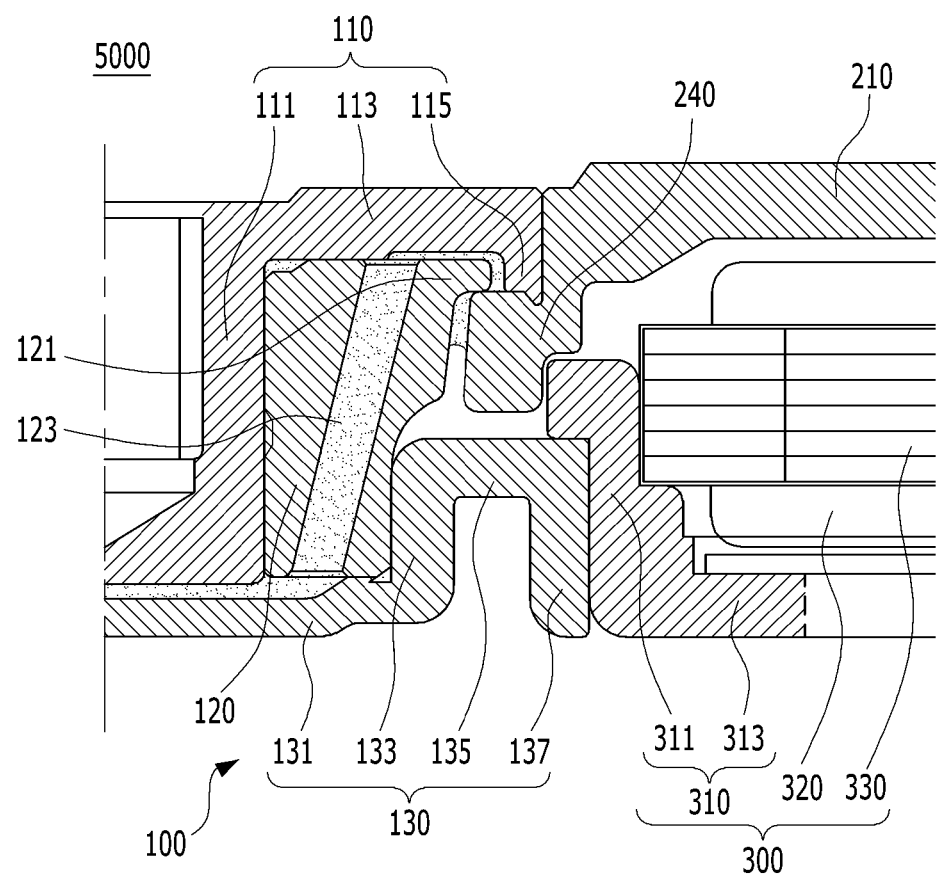
FIG. 7 is a cross-sectional view of half of a spindle motor according to a fifth embodiment of the present invention.

FIG. 7 is a cross-sectional view of half of a spindle motor according to a fifth embodiment of the present invention.

Referring to FIG. 7, a spindle motor 4000 according to the fifth embodiment of the present invention is the same as the spindle motor 1000 according to the first embodiment of the present invention, except for a coupling scheme of the cover plate 130 and the base member 310, so a description of components other than coupling scheme of the cover plate 130 and the base member 310 will be omitted.

The base member 310 may include a disk portion 313 and a coupling portion 311 extending from an inner end of the disk portion 313 upwardly in the axial direction. The core 330 may be coupled to an outer circumferential surface of the coupling portion 311.

Here, one surface of the core 330 may be in contact with an outer circumferential surface of the overall coupling portion 311, and a step may be formed on the outer circumferential surface of the coupling portion 311 and the core 330 may be installed on the step.

Also, an upper end of the coupling portion 311 may be protruded upwardly, relative to an upper surface of the core 330.

Here, the upper end of the coupling portion 311 protruded upwardly, relative to the upper surface of the core 330, may be bent inwardly in the radial direction so as to support an upper surface of an upper wall portion 135.

Thus, since the contact area between the cover plate 130 and the base member 310 is increased, binding strength between the cover plate 130 and the base member 310 can be enhanced.

Figure 8:
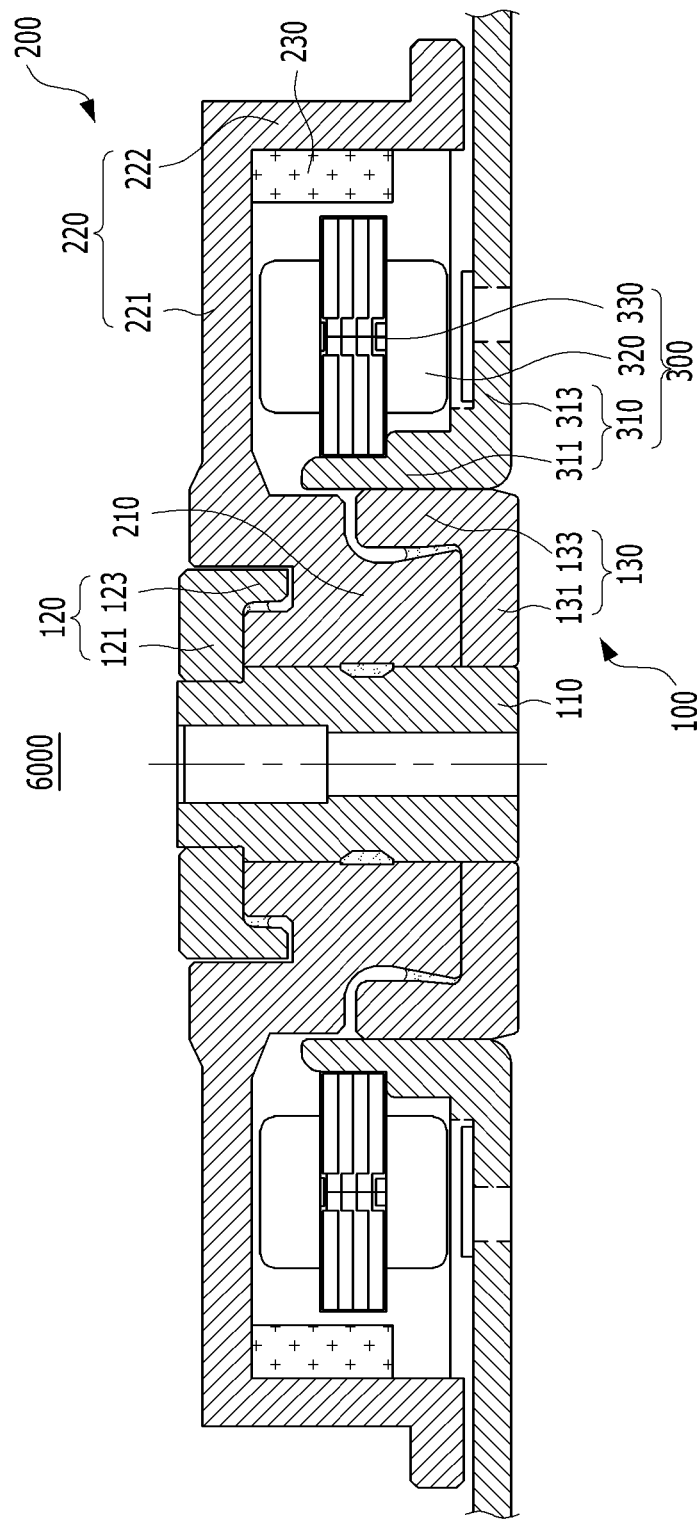
FIG. 8 is a schematic cross-sectional view of a spindle motor according to a sixth embodiment of the present invention.
Figure 9:
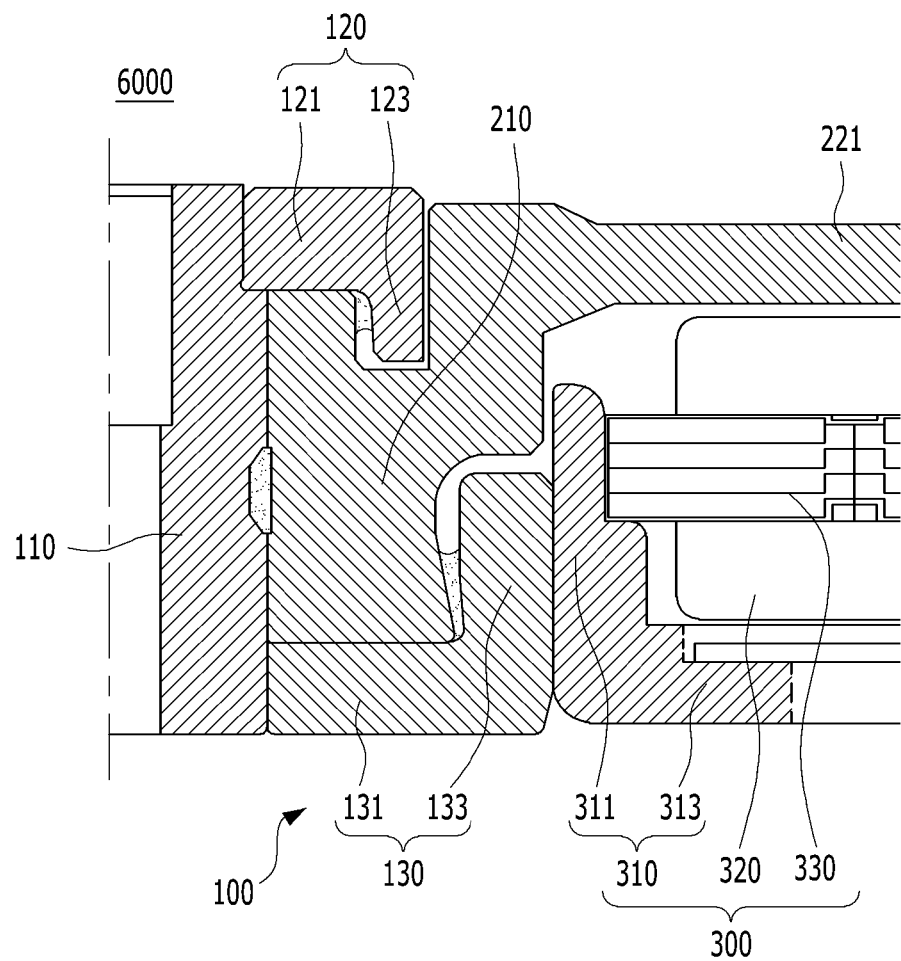
FIG. 9 is a cross-sectional view of half of a spindle motor according to the sixth embodiment of the present invention.

FIG. 8 is a schematic cross-sectional view of a spindle motor according to a sixth embodiment of the present invention. FIG. 9 is a cross-sectional view of half of a spindle motor according to the sixth embodiment of the present invention.

Referring to FIGS. 8 and 9, a spindle motor 6000 according to the sixth embodiment of the present invention may include a fluid dynamic pressure bearing assembly 100 and a stator 300 as a fixed member.

The fluid dynamic pressure bearing assembly 100 may include a shaft 110, a rotary member 200, an upper thrust member 120, and a lower thrust member 130.

A lower portion of the shaft 110 may be inserted into an insertion hole formed in a fixed portion 131 of the lower thrust member 130.

Namely, the lower portion of the shaft 110 may be united with the insertion hole of the fixed portion 131 according to at least one of sliding, adhesion, welding, and press-fitting, whereby the shaft 110 may be fixed.

Also, an upper portion of the shaft may be inserted into an insertion hole formed in a horizontal portion 121 of the upper thrust member 120.

Namely, the upper portion of the shaft 110 may be united with the insertion hole of the horizontal portion 121 according to at least one of sliding, adhesion, welding, and press-fitting.

Meanwhile, the shaft 110 may constitute a fixed member together with the upper thrust member 120 and the lower thrust member 130.

The upper thrust member 120 may include the horizontal portion 121 into which the shaft 110 is inserted, and a vertical portion 123 extending from an outer edge of the horizontal portion 121 downwardly in the axial direction.

A lubricating fluid may be sealed between an inner circumferential surface of the vertical portion 123 and a surface of the rotary member 200 facing the inner circumferential surface of the vertical portion 123, and to this end, the inner circumferential surface of the vertical portion 123 and the surface of the rotary member 200 facing the inner circumferential surface of the vertical portion 123 may be tapered.

Also, a thrust dynamic pressure generating portion (not shown) may be formed on at least one of a lower surface of the horizontal portion provided in the upper thrust member 120 and an upper surface of the sleeve 210 provided in the rotary member 200 in order to generate thrust dynamic pressure.

Namely, when the rotary member 200 is rotated, thrust dynamic pressure is generated by the thrust dynamic pressure generating portion (not shown), and thus, the rotary member 200 may be rotated more stably.

The lower thrust member 130 may include a fixed portion 131 having an insertion hole formed in the center thereof and allowing the shaft 110 to be inserted therethrough, and a bent portion 133 extending from an outer edge of the fixed portion 131 upwardly in the axial direction.

The lower thrust member 130 may be fixedly installed in the base member 310, and the shaft 110 may also be indirectly fixed to the base member 310 by the medium of the lower thrust member 130.

In detail, an outer circumferential surface of the bent portion 133 of the lower thrust member 130 may be coupled to an inner circumferential surface of the coupling portion 311 of the base member 310.

Also, a lubricating fluid may also be sealed between an inner circumferential surface of the bent portion 133 and a surface of the rotary member 200 facing the inner circumferential surface of the bent portion 133, and to this end, the inner circumferential surface of the bent portion 133 and the surface of the rotary member 200 facing the inner circumferential surface of the bent portion 133 may be tapered.

Also, a thrust dynamic pressure generating portion (not shown) may be formed on at least one of the upper surface of the fixed portion 131 provided in the lower thrust member 130 and a lower surface of the sleeve 210 provided in the rotary member 200 in order to generate thrust dynamic pressure.

Namely, when the rotary member 200 is rotated, thrust dynamic pressure is generated by the thrust dynamic pressure generating portion (not shown), and thus, the rotary member 200 may be rotated more stably.

The rotary member 200 is a member rotating relative to the fixed member, and it may include the sleeve 210 and the rotor hub 220.

The rotary member 200 may be rotatably installed by the medium of a lubricating fluid, while maintaining a bearing clearance with regard to the shaft 110, the upper thrust member 120, and the lower thrust member 130 therebetween, and a recording medium may be mounted thereon.

The rotary member 200 may include the sleeve 210 forming a bearing clearance with regard to the fixed member and the rotor hub 220 extending from the sleeve 210.

The sleeve 210 and the rotor hub 22 may coupled as separate members to constitute the rotary member 200, but in the spindle motor 6000 according to the sixth embodiment of the present invention, the sleeve 210 and the rotor hub 220 are integrally formed to constitute the rotary member 200.

In the case in which the sleeve 210 and the rotor hub 220 are integrally formed to constitute the rotary member 200, repeatable run out (RRO) may be reduced to minimize microvibrations, maximizing performance.

The sleeve 210 may be coupled to the shaft 110, the upper thrust member 120, and the lower thrust member 130, while maintaining a bearing clearance with regard to the shaft 110, the upper thrust member 120, and the lower thrust member 130 therebetween.

Also, a radial dynamic pressure generating portion (not shown) may be formed on an inner circumferential surface of the sleeve 210 in order to generate fluid dynamic pressure by the medium of a lubricating fluid when the sleeve 210 is rotated.

However, the radial dynamic pressure generating portion (not shown) is not limited to the formation thereof on the inner circumferential surface of the sleeve 210, and may be formed on an outer circumferential surface of the shaft 110.

The rotor hub 220 may include a hub base 221 extending from the sleeve 210 in the outer radial direction and a magnet support portion 222 extending from the hub base 221 in the axial direction.

An annular magnet 230 may be installed on an inner circumferential surface of the magnet support portion 222. The magnet 230 may be a permanent magnet having an N pole and an S pole alternately magnetized in the circumferential direction to generate a magnetic field having predetermined strength.

Also, the magnet 230 may be disposed to face the core 320 around which the coil 310 is wound. The magnet 230 serves to generate driving force (or power) enabling the rotary member 200 to rotate according to an electromagnetic interaction with the core 320 with the coil 310 wound therearound.

Namely, when power is supplied to the coil 310, driving force enabling the rotary member 200 to rotate according to an electromagnetic interaction between the core 320 with the coil 310 wound therearound and the magnet 230 is generated, so the rotary member 200 may rotate about the shaft 110 (by being centered thereon).

The stator 300 may include the coil 320, the core 330, and the base member 310.

The stator 300 is a fixed structure having the core 330 around which the coil 320 generating electromagnetic force having a predetermined magnitude when power is applied thereto is wound.

The core 330 may be fixedly disposed on a base member 310 in which a printed circuit board (PCB) (not shown) with a pattern circuit printed thereon. A plurality of coil holes having a predetermined size may be formed in a penetrative manner in an upper surface of the base member 310 corresponding to the core 330 around which the coil 320 is wound, such that the coil is exposed downwardly. The coil 320 may be electrically connected to the PCB (not shown) such that external power is applied thereto.

The base member 310 may be fabricated by performing plastic working (or press working) on a steel sheet.

In detail, a basic configuration of the base member 310 may be fabricated through press working, and subsequently bent or cut as follow-up working to fabricate a final configuration of the base member 310.

Namely, the base member 310 of the spindle motor 6000 according to the sixth embodiment of the present invention may be produced by performing plastic working such as press working, or the like, on a lightweight alloy steel such as a cold rolled steel sheet (e.g., steel plate cold commercial (SPCC), SPEC, or the like), a hot rolled steel sheet, a stainless steel, a boron or a magnesium alloy, or the like, through a single process or an additional process, unlike the related art in which the base member is produced by a post-processing scheme in which aluminum (A) is die-cast and burrs, or the like, generated through the die-casting are removed.

Thus, since the base member 310 of the spindle motor 6000 according to the sixth embodiment of the present invention is fabricated through press-working, a process time and energy consumption can be minimized, resultantly enhancing production capacity.

The base member 310 may include the disk portion 313 and the coupling portion 311 extending from an inner edge of the disk portion 313 upwardly in the axial direction, and the core 330 may be coupled to an outer circumferential surface of the coupling portion 311.

Here, one surface of the core 330 may be in contact with an outer circumferential surface of the overall coupling portion 311, and an upper end of the coupling portion 311 may be protruded upwardly, relative to an upper surface of the core 330.

Thus, since a contact area between the core 330 and the base member 310 is increased, binding strength between the core 330 and the base member 310 can be enhanced.

Figure 10:
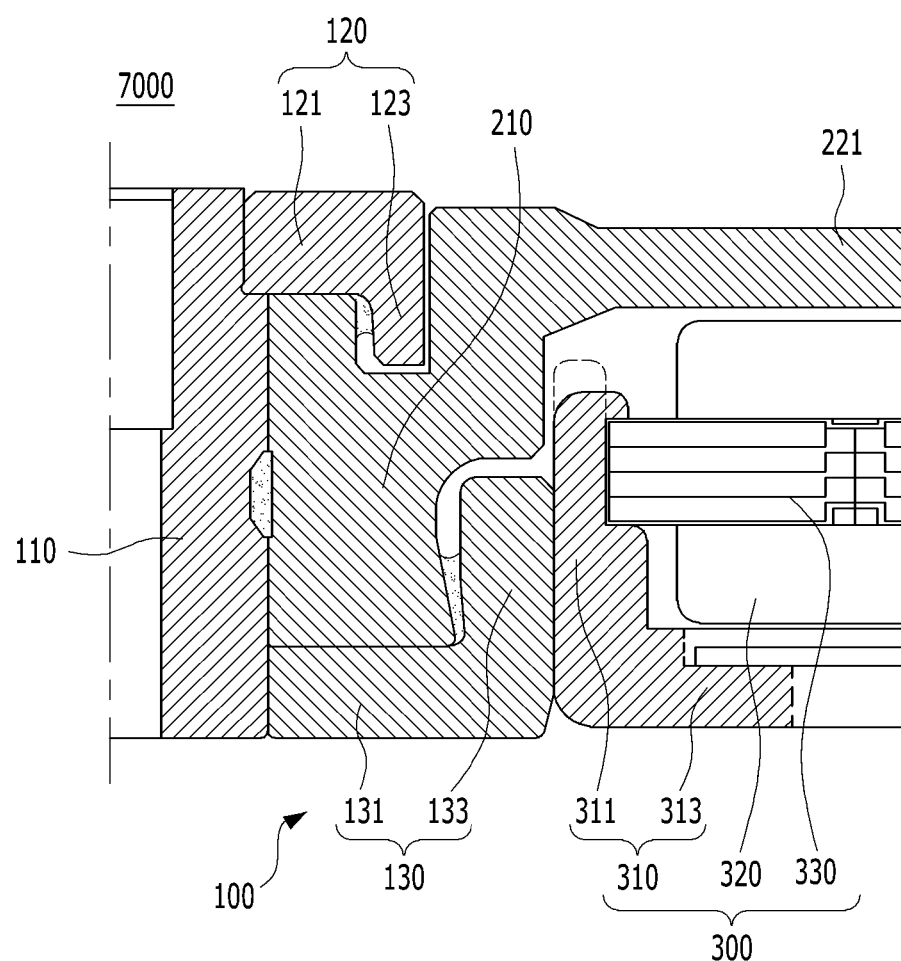
FIG. 10 is a cross-sectional view of half of a spindle motor according to a seventh embodiment of the present invention.

FIG. 10 is a cross-sectional view of half of a spindle motor according to a seventh embodiment of the present invention.

Referring to FIG. 10, a spindle motor 7000 according to the seventh embodiment of the present invention is the same as the spindle motor 6000 according to the sixth embodiment of the present invention, except for a coupling scheme of the base member 310 and the core 330, so a description of components other than the coupling scheme of the base member 310 and the core 330 will be omitted.

The base member 310 may include a disk portion 313 and a coupling portion 311 extending from an inner end of the disk portion 313 upwardly in the axial direction.

The core 330 may be coupled to an outer circumferential surface of the coupling portion 311.

Here, one surface of the core 330 may be in contact with an outer circumferential surface of the overall coupling portion 311, and a step may be formed in the outer circumferential surface of the coupling portion 311 and the core 330 may be installed on the step.

Also, an upper end of the coupling portion 311 may be protruded upwardly, relative to an upper surface of the core 330.

Here, the upper end of the coupling portion 311 protruded upwardly, relative to the upper surface of the core 330, may be bent outwardly in the radial direction so as to support the upper surface of the core 330.

Thus, since the contact area between the core 330 and the base member 310 is increased, binding strength between the core 330 and the base member 310 can be enhanced.

Figure 11:
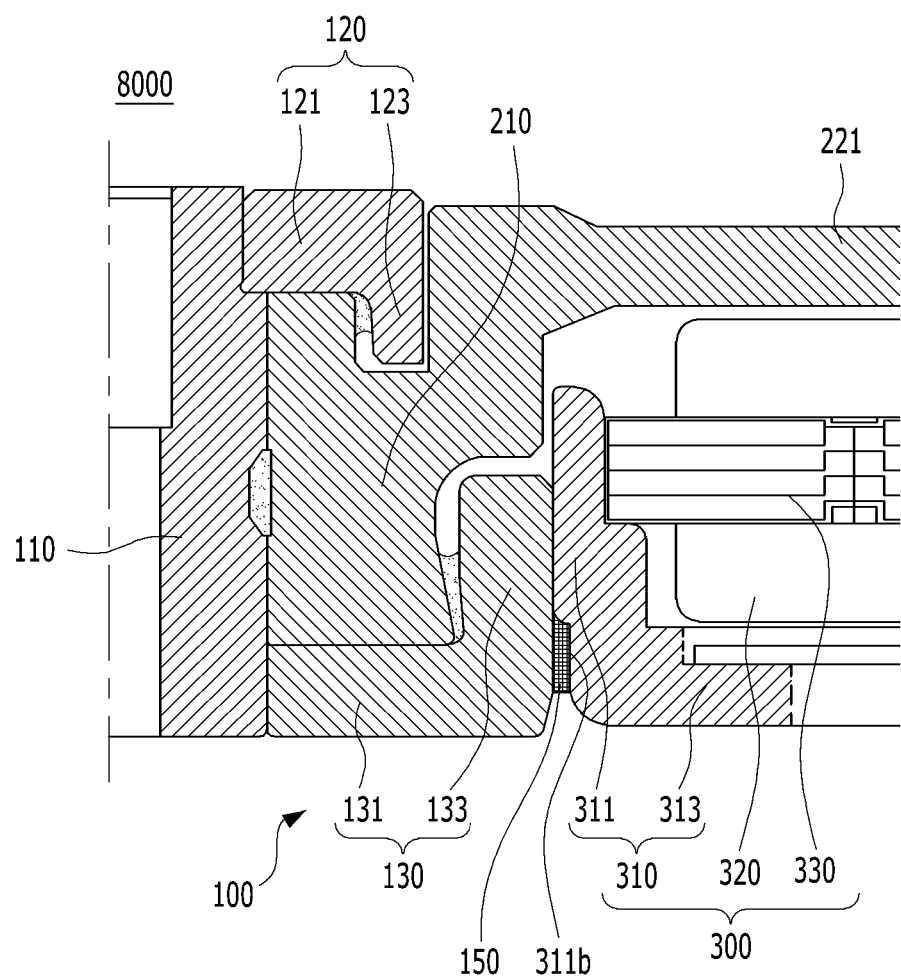
FIG. 11 is a cross-sectional view of half of a spindle motor according to an eighth embodiment of the present invention.

FIG. 11 is a cross-sectional view of half of a spindle motor according to an eighth embodiment of the present invention.

Referring to FIG. 11, a spindle motor 8000 according to the eighth embodiment of the present invention is the same as the spindle motor 6000 according to the sixth embodiment of the present invention, except for the sealing member 150, so a description of components other than the sealing member 150 will be omitted.

A portion of the inner circumferential surface of the coupling portion 311 provided in the base member 310 may be depressed inwardly to form an accommodation recess 311b.

The sealing member 150 may be provided in the accommodation portion 311b to reduce noise or vibration that may be generated while the spindle motor is being driven.

The sealing member 150 may be made of plastic, rubber, a resin, aluminum, brass, or a magnesium alloy, but the present invention is not limited thereto and the sealing member 150 may be made of any material as long as it can obtain noise or vibration reducing effect.

Also, an adhesive may be used as the sealing member 150, and the adhesive filling the accommodation recess 311b can enhance binding strength between the lower thrust member 130 and the base member 310.

Also, since the sealing member 150 fills the accommodation recess 311b, deformation of the spindle motor due to external impacts can be further effectively prevented.

Figure 12:
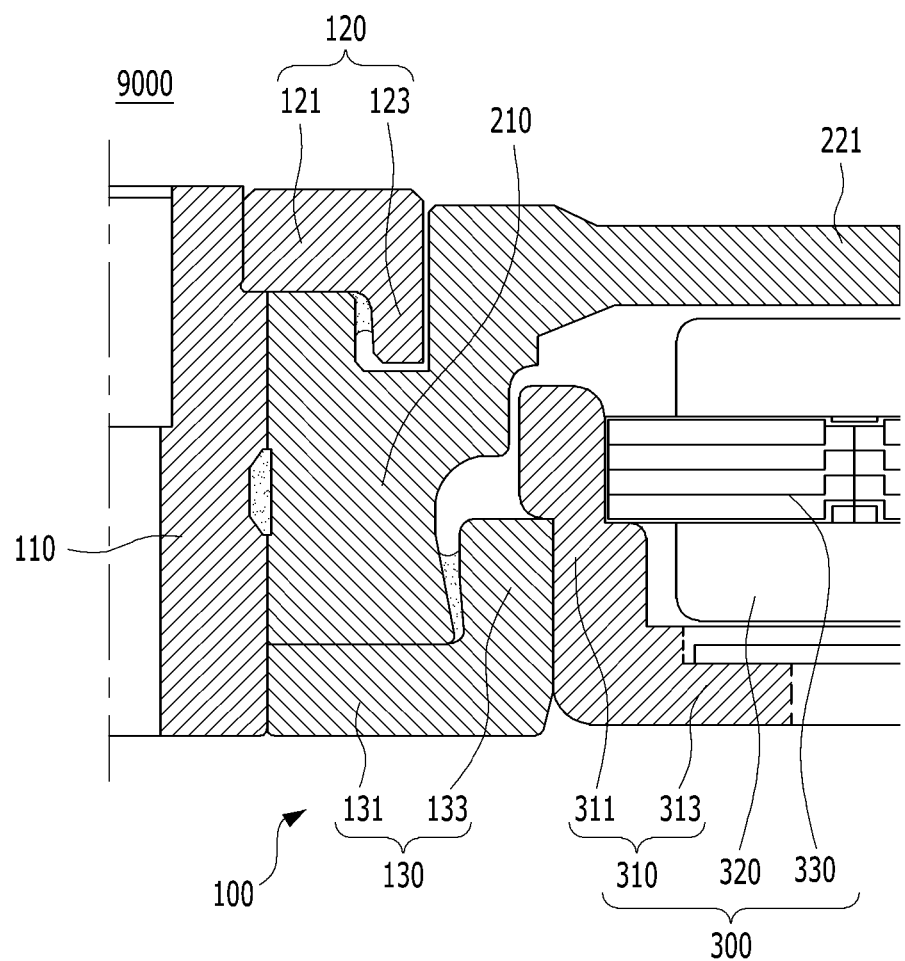
FIG. 12 is a cross-sectional view of half of a spindle motor according to a ninth embodiment of the present invention.

FIG. 12 is a cross-sectional view of half of a spindle motor according to a ninth embodiment of the present invention.

Referring to FIG. 12, a spindle motor 9000 according to the ninth embodiment of the present invention is the same as the spindle motor 6000 according to the sixth embodiment of the present invention, except for a coupling scheme of the lower thrust member 130 and the base member 310, so a description of components other than the coupling scheme of the lower thrust member 130 and the base member 310 will be omitted.

The base member 310 may include a disk portion 313 and a coupling portion 311 extending from an inner end of the disk portion 313 upwardly in the axial direction. The core 330 may be coupled to an outer circumferential surface of the coupling portion 311.

Here, one surface of the core 330 may be in contact with an outer circumferential surface of the overall coupling portion 311, and a step may be formed in the outer circumferential surface of the coupling portion 311 and the core 330 may be installed on the step.

Also, an upper end of the coupling portion 311 may be protruded upwardly, relative to an upper surface of the core 330.

Here, the upper end of the coupling portion 311 protruded upwardly, relative to the upper surface of the core 330, may be bent inwardly in the radial direction so as to support an upper surface of the bent portion 133 provided in the lower thrust member 130.

Thus, since the contact area between the lower thrust member 130 and the base member 310 is increased, binding strength between the lower thrust member 130 and the base member 310 can be enhanced.

Figure 13:
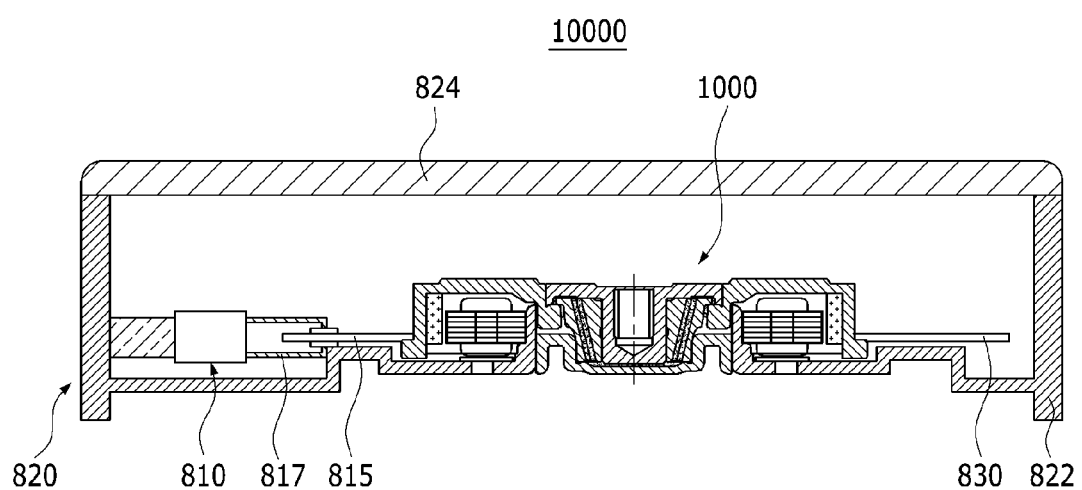
FIG. 13 is a schematic cross-sectional view of a disk driving apparatus using a spindle motor according to an embodiment of the present invention.

FIG. 13 is a schematic cross-sectional view of a disk drive using a spindle motor according to an embodiment of the present invention.

Referring to FIG. 13, a recording disk drive 10000 including a spindle motor according to an embodiment of the present invention installed therein may be a hard disk drive and include the spindle motor 1000, a head driving unit 810, and a housing 820.

The spindle motor 1000 may have all the characteristics of the spindle motor 1000 according to an embodiment of the present invention as described above, and may include a recording disk 830 mounted thereon.

The head driving unit 810 may transfer a magnetic head 815 reading information from the recording disk 830 mounted on the spindle motor 1000 to a potion of a surface of the recording disk 830 desired to be read.

Here, the magnetic head 815 may be disposed on a support portion 817 of the head driving unit 810.

In order to form an internal space for accommodating the spindle motor 1000 and the head driving unit 810, the housing 820 may include a motor mounting plate 822 and a top cover 824 shielding an upper portion of the motor mounting plate 822.

Through the foregoing embodiments, the spindle motor according to the present invention can have enhanced rigidity, satisfy compactness and thinness requirements, and have an increased bearing span length. In addition, the presence of the labyrinth sealing portion prevents leakage of a lubricating fluid and an introduction of foreign objects.

As set forth above, according to embodiments of the invention, in the spindle motor and the hard disk drive including the same according to embodiments of the invention, rigidity of the spindle motor can be enhanced, and bonding force between the base member and the core may be enhanced.

Also, an internal component is prevented from being deformed even in the case that external impacts, or the like, are applied.

Also, since the base member and the cover plate are fabricated by performing plastic deformation on a steel sheet, production capacity can be enhanced.

Also, a storage space of a lubricating fluid is increased to lengthen a lifespan of the spindle motor, leakage of a lubricating fluid can be prevented, and an introduction of an external foreign object can be prevented.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
a fluid dynamic pressure bearing assembly;
a base member coupled to the fluid dynamic pressure bearing assembly; and
a core fixedly coupled to the base member and having a coil wound therearound,
wherein the base member has a disk portion and a coupling portion extending from an inner edge of the disk portion upwardly in an axial direction,
one surface of the core is in contact with an outer circumferential surface of the overall coupling portion, and an upper end of the coupling portion is protruded upwardly, relative to an upper surface of the core, and
the fluid dynamic pressure bearing assembly comprises
a shaft having a body portion, an extending portion extending from an upper portion of the body portion outwardly in the radial direction, and a protrusion portion extending from an outer edge of the extending portion in an axial direction;
a sleeve rotatably supporting the shaft; and
a cover plate coupled to the sleeve, while maintaining a gap with regard to the shaft and a lower portion of the sleeve,
wherein the fluid dynamic pressure bearing assembly further comprises a rotor having a hub base coupled to the extending portion so as to be rotatable in conjunction with the shaft and a stopper portion extending from the hub base such that the stopper portion faces an outer circumferential surface of the sleeve.

2. The spindle motor of claim 1, wherein a labyrinth sealing portion is provided between the fluid dynamic pressure bearing assembly and the coupling portion.

3. A hard disk drive comprising:
a spindle motor rotating a disk with power applied through a board, according to claim 2;
a magnetic head for writing data to the disk or reading data from the disk; and
a head driving unit moving the magnetic head to a predetermined position on the disk.

4. The spindle motor of claim 1, wherein a recess portion is formed to be depressed in the coupling portion of the base member coupled to the fluid dynamic pressure bearing assembly, and a sealing member is provided in the recess portion.

5. A hard disk drive comprising:
a spindle motor rotating a disk with power applied through a board, according to claim 4;
a magnetic head for writing data to the disk or reading data from the disk; and
a head driving unit moving the magnetic head to a predetermined position on the disk.

6. The spindle motor of claim 1, wherein the cover plate includes an airtight portion disposed below the shaft and the sleeve, an inner wall portion extending from the airtight portion in the axial direction and coupled to an outer circumferential surface of the sleeve, an outer wall portion coupled to the base member, and an upper wall portion connecting an upper end of the inner wall portion and an upper end of the outer wall portion.

7. The spindle motor of claim 1, wherein a micro-gap is formed between an outer circumferential surface of the stopper portion and an inner circumferential surface of the coupling portion.

8. The spindle motor of claim 1, wherein a first sealing recess is formed to be depressed inwardly on an outer circumferential surface of the stopper portion, and a second sealing recess is formed to be depressed inwardly on an inner circumferential surface of the coupling portion at a position corresponding to the first sealing recess.

9. The spindle motor of claim 1, wherein an outer circumferential surface of the stopper portion is formed to be stepped inwardly in the radial direction, and an inner circumferential surface of the coupling portion disposed to face the outer circumferential surface of the stopper portion has a shape corresponding to the outer circumferential surface of the stopper portion.

10. The spindle motor of claim 1, wherein an upper end of the coupling portion is bent inwardly in the radial direction and supports an upper surface of the upper wall portion.

11. The spindle motor of claim 1, wherein a fluid-air interface of a lubricating fluid is formed between a lower surface of the stopper portion and an upper surface of the upper wall portion.

12. The spindle motor of claim 1, wherein the lower surface of the stopper portion and the upper surface of the upper wall portion face one another, and the lower surface of the stopper portion and the upper surface of the upper wall portion are sloped.

13. The spindle motor of claim 12, wherein the lower surface of the stopper portion and the upper surface of the upper wall portion are sloped downwardly toward an outer side in the radial direction.

14. A hard disk drive comprising:
a spindle motor rotating a disk with power applied through a board, according to claim 1;
a magnetic head for writing data to the disk or reading data from the disk; and
a head driving unit moving the magnetic head to a predetermined position on the disk.

15. A spindle motor comprising:
a fluid dynamic pressure bearing assembly;
a base member coupled to the fluid dynamic pressure bearing assembly; and
a core fixedly coupled to the base member and having a coil wound therearound,
wherein the base member has a disk portion and a coupling portion extending from an inner edge of the disk portion upwardly in an axial direction,
one surface of the core is in contact with an outer circumferential surface of the overall coupling portion, and an upper end of the coupling portion is protruded upwardly, relative to an upper surface of the core, and
the upper end of the coupling portion is bent outwardly in a radial direction and supports the upper surface of the core.

16. A hard disk drive comprising:
a spindle motor rotating a disk with power applied through a board, according to claim 15;
a magnetic head for writing data to the disk or reading data from the disk; and
a head driving unit moving the magnetic head to a predetermined position on the disk.

17. A spindle motor comprising:
a fluid dynamic pressure bearing assembly;
a base member coupled to the fluid dynamic pressure bearing assembly; and
a core fixedly coupled to the base member and having a coil wound therearound,
wherein the base member has a disk portion and a coupling portion extending from an inner edge of the disk portion upwardly in an axial direction,
one surface of the core is in contact with an outer circumferential surface of the overall coupling portion, and an upper end of the coupling portion is protruded upwardly, relative to an upper surface of the core, and
the fluid dynamic pressure bearing assembly comprises:
a shaft directly or indirectly fixed to the base member;
a rotary member forming a bearing clearance with regard to the shaft and rotatable with respect to the shaft; and
a lower thrust member having a fixed portion coupled to a lower portion of the shaft, and a bent portion extending from an outer edge of the fixed portion and having an outer circumferential surface coupled to the base member.

18. The spindle motor of claim 17, wherein an upper end of the coupling portion is bent inwardly in the radial direction and supports an upper surface of the bent portion.

* * * * *

UNITED STATES PATENT AND TRADEMARK OFFICE
CERTIFICATE OF CORRECTION

| | |
|---|---|
| PATENT NO. | : 8,780,492 B1 |
| APPLICATION NO. | : 13/795171 |
| DATED | : July 15, 2014 |
| INVENTOR(S) | : Viatcheslav Smirnov |

It is certified that error appears in the above-identified patent and that said Letters Patent is hereby corrected as shown below:

In the Claims

Column 18, Line 18, In Claim 17 delete "comprises:" and insert -- comprises --, therefor.

Signed and Sealed this
Fourth Day of November, 2014

Michelle K. Lee
*Deputy Director of the United States Patent and Trademark Office*